(12) United States Patent
Blanchard, III et al.

(10) Patent No.: US 7,752,534 B2
(45) Date of Patent: Jul. 6, 2010

(54) METHOD AND APPARATUS FOR CUSTOMIZING THE DISPLAY OF MULTIDIMENSIONAL DATA

(75) Inventors: John A. Blanchard, III, Algonquin, IL (US); Jennifer Martin, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 11/533,058

(22) Filed: Sep. 19, 2006

(65) Prior Publication Data
US 2008/0072145 A1 Mar. 20, 2008

(51) Int. Cl.
*G06F 17/27* (2006.01)
(52) U.S. Cl. .............. 715/204; 707/5; 707/6; 707/7; 707/102; 715/201; 715/202; 715/203
(58) Field of Classification Search .......... 715/200–208
See application file for complete search history.

(56) References Cited

U.S. PATENT DOCUMENTS

| | | | |
|---|---|---|---|
| 5,805,911 A | 9/1998 | Miller | |
| 6,453,329 B1* | 9/2002 | Dodgen | 715/205 |
| 6,499,026 B1* | 12/2002 | Smith et al. | 707/2 |
| 7,003,522 B1 | 2/2006 | Reynar et al. | |
| 7,246,134 B1* | 7/2007 | Kitain et al. | 707/102 |
| 7,412,534 B2* | 8/2008 | Tsang et al. | 709/231 |
| 2003/0050927 A1* | 3/2003 | Hussam | 707/5 |
| 2004/0030543 A1 | 2/2004 | Kida et al. | |
| 2004/0088650 A1* | 5/2004 | Killen et al. | 715/503 |
| 2007/0150487 A1* | 6/2007 | Christian et al. | 707/100 |
| 2008/0016052 A1* | 1/2008 | Frieden | 707/5 |
| 2008/0016053 A1* | 1/2008 | Frieden et al. | 707/5 |
| 2008/0016061 A1* | 1/2008 | Frieden et al. | 707/6 |
| 2008/0016071 A1* | 1/2008 | Frieden | 707/7 |
| 2008/0016072 A1* | 1/2008 | Frieden et al. | 707/7 |
| 2008/0016098 A1* | 1/2008 | Frieden et al. | 707/102 |
| 2008/0034291 A1* | 2/2008 | Anderson et al. | 715/700 |

(Continued)

FOREIGN PATENT DOCUMENTS

GB 1184798 A2 * 2/1998

OTHER PUBLICATIONS

Kai Bielenberg and Marc Zacher; Groups in Social Software: Utilizing Tagging to Integrate Individual Contexts for Social Navigation; Aug. 16, 2005, Universitat Bremen, p. 11, 78, 81, 85, 100, 103-104.*

(Continued)

*Primary Examiner*—Doug Hutton
*Assistant Examiner*—Andrew R Dyer
(74) *Attorney, Agent, or Firm*—Yee & Associates, P.C.; William H. Steinberg; Rudolf O. Siegesmund

(57) ABSTRACT

A Tag Cloud Customizer (TCC) provides an interactive legend and a tag cloud generator that allows a user to customize a tag cloud. The interactive legend allows users to map custom display characteristics to a plurality of tag attributes. The tag cloud generator creates a custom tag cloud using the custom display characteristics. The user can also sort the order of tags in the tag cloud by any of the plurality of tag attributes. In one embodiment of TCC, the user can define a custom tag attribute.

17 Claims, 5 Drawing Sheets

U.S. PATENT DOCUMENTS

2008/0059897 A1* 3/2008 Dilorenzo .................. 715/764
2008/0071929 A1* 3/2008 Motte et al. ................ 709/246

OTHER PUBLICATIONS

Michael Young; Microsoft Office System Inside Out: 2003 Edition; Sep. 10, 2003, Microsoft Press, p. 10.*

Lisa Lee; Absolute Beginner's Guide to Adobe Photoshop Elements 2; Oct. 24, 2002; p. 4.*

Leon Brocard, HTML::TagCloud-Generate An HTML Tag Cloud, 2005, mirror.sit.wisc.edu/pub/CPAN/modules/by-module/HTML/HTML-TagCloud-0.33.readme.*

* cited by examiner

METHOD AND APPARATUS FOR CUSTOMIZING THE DISPLAY OF MULTIDIMENSIONAL DATA

FIELD OF THE INVENTION

The present invention relates generally to data processing and relates specifically to customizing the display of multidimensional data.

BACKGROUND OF THE INVENTION

A "metatag," referred to herein as a "tag," is a keyword or descriptive term associated with an item as means of classification. Tags are typically used in the metadata of items such as computer files, web pages, digital images, and internet bookmarks. In a typical web page, for example, the page creator adds one or more tags associated with the web page contents. A web page displaying vacation photos from Europe might have tags such as "Europe," "vacation," "Paris," and "pictures." Once the web page is published on the Internet, an automated classification system, such as GOOGLE, may index the web page using the tags as search terms. The indexing software will provide links to the web page based on the keyword tag. Some web-based search engines and classification systems specialize in specific content. FLICKR (www.flickr.com) is a popular digital photo sharing website that allows users to search photographs by keyword. These specialized websites amass collections of tags, allowing for multiple "browseable paths" for accessing the web page contents. Browseable paths are generated by the results of a keyword search. For example, if a web user wants to find a picture of buildings in Paris, the user can go to FLICKR and search for images that users have tagged with the words "Paris" and "buildings." FLICKR generates a list of links to indexed pictures of buildings in Paris.

A "tag cloud" is a visual depiction of tags and tag attributes. One widely known tag cloud appears on FLICKR. Tag clouds have been popularized by TECHNORATI, an Internet search engine used for searching blogs. In the most common form, tag clouds display popular tags (frequently used tags) in a larger font while listing the tags in alphabetical order. Thus, manually searching tags by both name and popularity is possible. Usually, the web user has an option to sort the list by popularity—which will put the largest text tags at the top of the list, and the smallest at the end of the list. Selecting a single tag from a tag cloud by clicking on the tag with a mouse pointer leads the user to a collection of web pages or other items associated with that tag.

FIG. 1. shows an exemplary Internet browser 100 displaying tag cloud 110. Tag cloud 110 lists a series of tags in alphabetical order. Popular tags are displayed with a larger font, and less popular tags are displayed in a smaller font. Legend 120 explains the sort criteria and tag attributes used by the tag cloud. Clicking on the underlined "popularity" hyperlink in legend 120 sorts the tag cloud by popularity.

Tag clouds have evolved to display multiple tag attributes at the same time. Tag clouds use colors or other display characteristics in addition to font size for indicating tag attributes. For example, different colors can indicate how recently an item related to the tag has been updated, where red tags represent recently updated items, and blue tags represent older items. "Hover effects" have been added to tag clouds, including highlighting a tag under a mouse pointer, and displaying the corresponding URL or a comment related to the tag in a "mouse-over tool-tip." Mouse-over tool-tips are small pop-up windows that appear when a mouse pointer hovers over an active region of a window, and that generally display information related to the active region. Although these enhancements increase the amount of information communicated by a tag cloud, only the creator of the tag cloud has control over the displayed tag attributes. At most, users can only change the sort criteria from an alphabetical tag attribute to another displayed tag attribute such as most popular or most recently updated.

A need exists for method of allowing tag cloud users to select preferred tag attributes and customize how the tag attributes are displayed. These and other objects of the invention will be apparent to those skilled in the art from the following detailed description of a preferred embodiment of the invention.

SUMMARY OF THE INVENTION

A Tag Cloud Customizer (TCC) provides an interactive legend and a tag cloud generator that enables a user to customize a tag cloud. The interactive legend allows users to map custom display characteristics to a plurality of tag attributes. The tag cloud generator creates a custom tag cloud using the custom display characteristics. The user can also sort the order of tags in the tag cloud by any of the plurality of tag attributes. In one embodiment of TCC, the user can define a custom tag attribute.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Tag Cloud Customizer (TCC).

Figure 1:
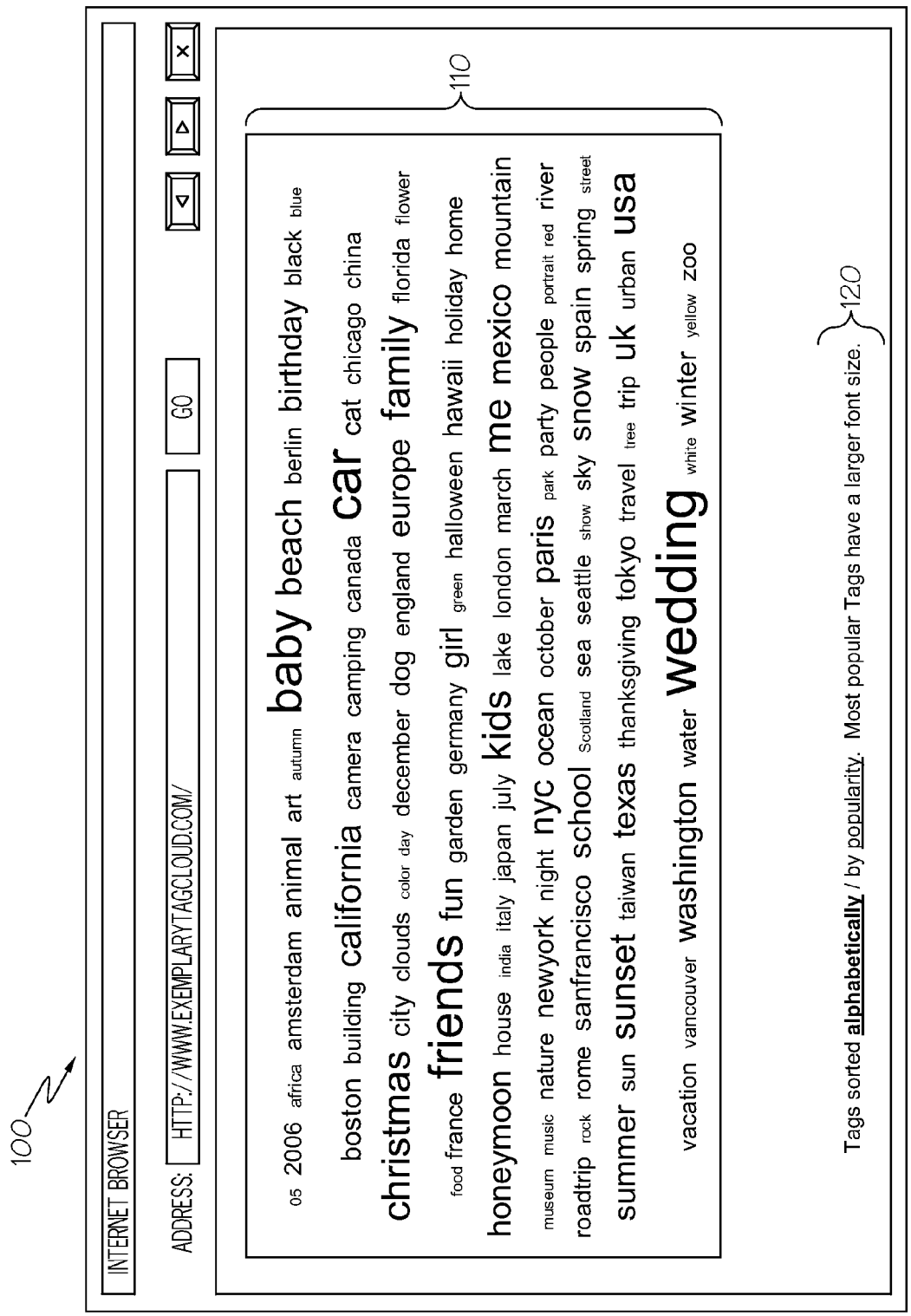
FIG. 1 is an exemplary web page with a prior art tag cloud.
Figure 2:
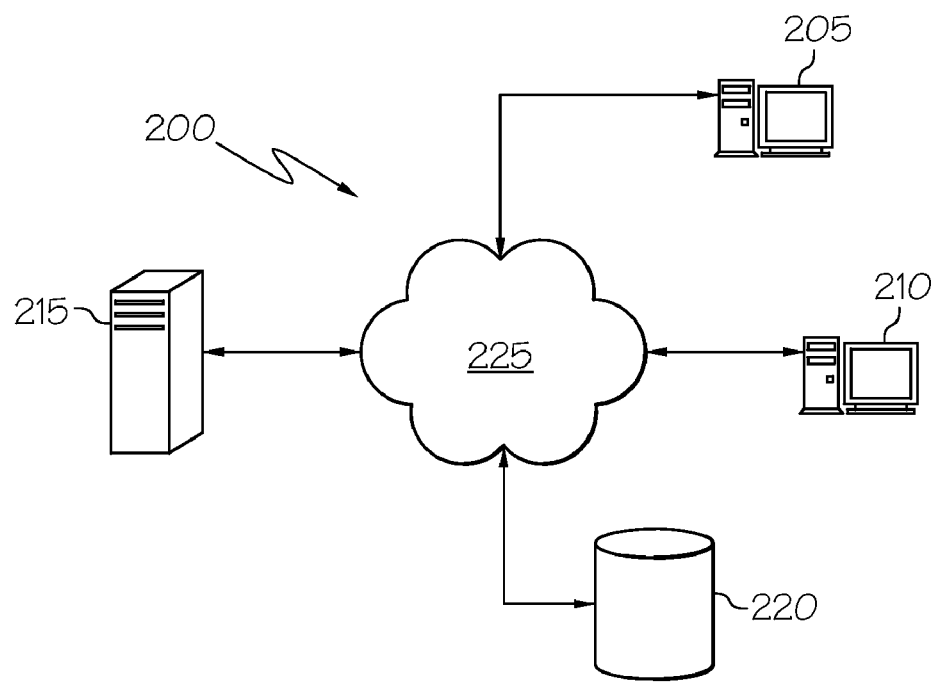
FIG. 2 is an exemplary computer network.

Additionally, the TCC is described below with reference to an exemplary network of hardware devices, as depicted in FIG. 2. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 200 has only a limited number of nodes, including workstation computer 205, workstation computer 210, server computer 215, and persistent storage 220. Network connection 225 comprises all hardware, software, and communications media necessary to enable communication between network nodes 205-220. Unless otherwise indicated in context below, all network nodes use publicly available protocols or messaging services to communicate with each other through network connection 225.

Figure 3:
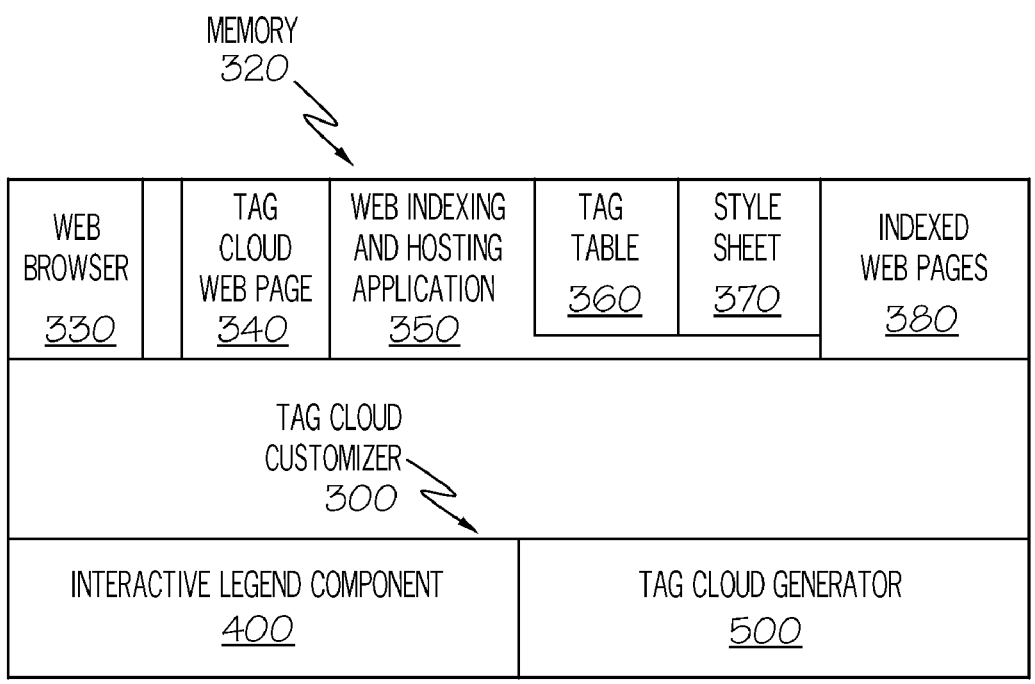
FIG. 3 describes programs and files in a memory on a computer.

TCC 300 typically is stored in a memory, represented schematically as memory 320 in FIG. 3. The term "memory," as used herein, includes without limitation, any volatile or persistent medium, such as an electrical circuit, magnetic disk, or optical disk, in which a computer can store data or software for any duration. A single memory may encompass and be distributed across a plurality of media. Further TCC 300 may reside in more than one memory distributed across different computers, servers, logical partitions, or other hardware devices. The elements depicted in memory 320 may be located in or distributed across separate memories in any combination, and TCC 300 may be adapted to identify, locate and access any of the elements and coordinate actions, if any, by the distributed elements. Thus, FIG. 3 is included merely as a descriptive expedient and does not necessarily reflect any particular physical embodiment of memory 320. As depicted in FIG. 3, though, memory 320 may include additional data and programs. Of particular import to TCC 200, memory 320 may include web browser 330, tag cloud web page 340, web indexing and hosting application 350, tag table 360, style sheet 370, and indexed web pages 380 with which TCC 300 interacts. TCC 300 comprises two components: interactive legend component 400 and tag cloud generator 500. In a preferred embodiment, the components of TCC 300 are a script residing on tag cloud web page 340.

A user of web browser 330 accesses tag cloud web page 340 hosted by web indexing and hosting application 350. Although web indexing and hosting application 350 is shown here as a single application, the indexing functions and hosting functions can be, and often are, separate applications. The indexing function of web indexing and hosting application 350 collects tags from indexed web pages 380, and stores the tags in tag table 360. Additionally, web indexing and hosting application 350 collects other statistical information related to indexed web pages 360, such as how often a web page is accessed and when a web page is last accessed or updated. The collected information is stored in tag table 360 with the corresponding tags. The tag cloud on tag cloud web page 340 is generated by TCC 300, using tags and attributes from tag table 360 and display characteristics from style sheet 370. Style sheet 370 contains default display characteristics for generating the tag cloud, so that whenever tag cloud web page 340 is accessed, a default tag cloud is generated. TCC 300 sorts tag cloud alphabetically by default.

Figure 4:
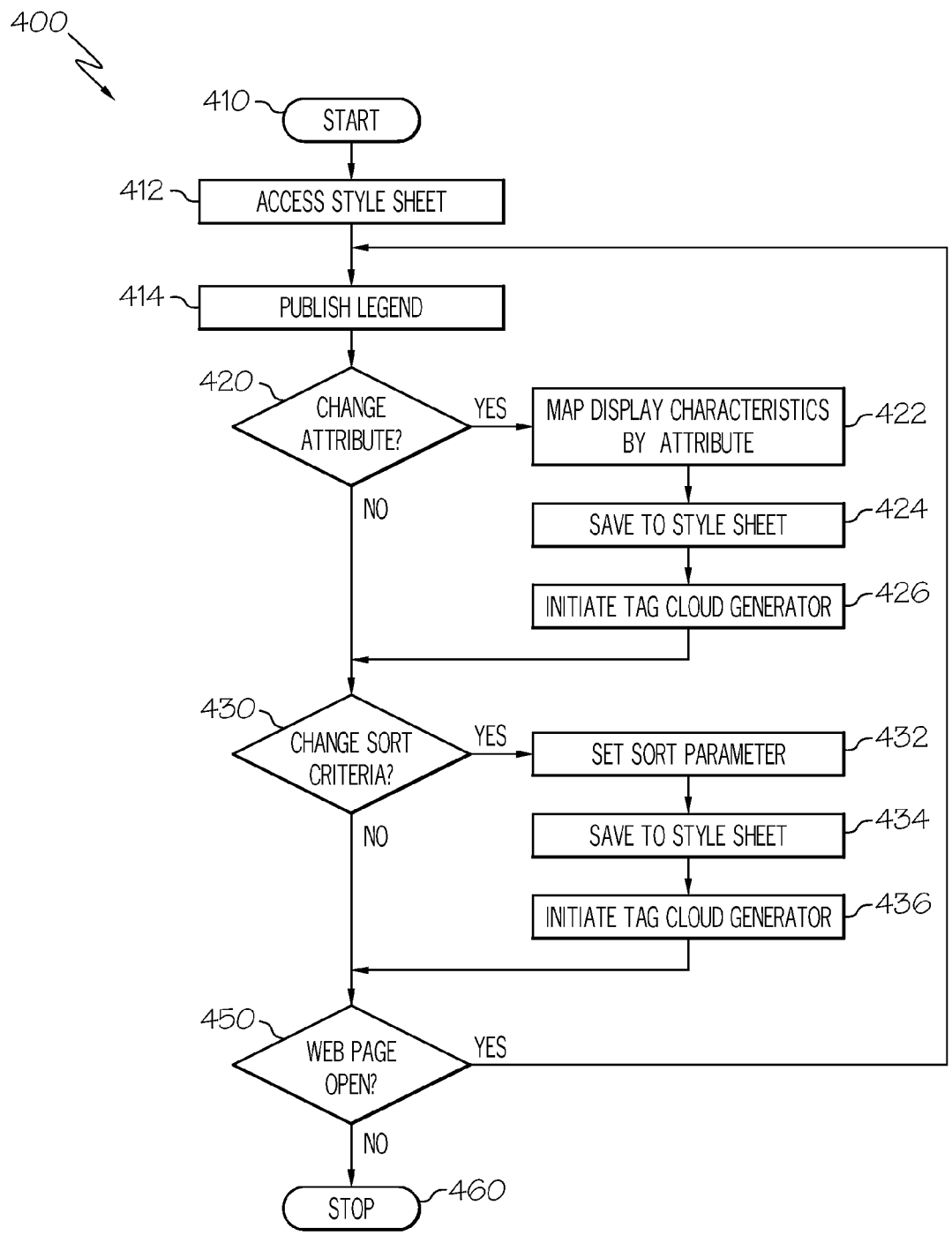
FIG. 4 is a flowchart of a legend component.

A shown by FIG. 4, interactive legend component 400 starts whenever a user of web browser 330 accesses tag cloud web page 340 (410). Interactive legend component 400 accesses style sheet 370 (412) and publishes an interactive legend in a frame of tag cloud web page 340 describing the current display characteristics for the tag cloud displayed in another frame of tag cloud web page 340 (414). The interactive legend lists available tag attributes, as indexed by web indexing and hosting application 350, such as popularity, last update or age of the item, frequency of updates, most recently accessed, size of the item, and whether there have been comments or replies related to the item. Interactive legend component 400 also provides a means for a user to customize display characteristic for each tag attribute. For example, next to the popularity tag attribute, the interactive legend may have a drop down menu allowing the user to select from a list of display characteristics such as font color, font size, transparency/opacity, background color, borders, motion, underlines, italics, strikethroughs, 3D depth, or shadowing. The user can choose to change how a tag attribute is displayed (420) by selecting a display characteristic from the drop down menu. Additionally, the user may choose "none" if the user does not want a specific tag attribute displayed in the tag cloud. If a tag attribute's display characteristic is changed, interactive legend component 400 maps the selected display characteristic to the tag attribute (422), saves the mapping to style sheet 370 (424), and initiates tag cloud generator 500 (426). Tag cloud generator 500 refreshes the tag cloud displayed on web page 340 to reflect the changes. Interactive legend component 400 also provides a means for the user to sort the tag cloud by tag attribute. For example, the interactive legend may have a "sort by" drop down menu listing all available tag attributes. The user can choose to change the sort criteria (430) by selecting a tag attribute from the "sort by" drop down menu. If the sort criteria is changed, interactive legend component 400 sets a sort parameter (432), saves the sort parameter to style sheet 370 (434), and initiates tag cloud generator 500 (436). Tag cloud generator 500 refreshes the tag cloud displayed on web page 340 to reflect the changes. Interactive legend component 400 determines if tag cloud web page 340 is open in web browser 330 (450). Interactive legend component 400 provides customizable display and sort options in an interactive legend (steps 414-436) for as long as tag cloud web page 340 is open in web browser 330. If web browser 330 closes or leaves tag cloud web page 340, interactive legend component 400 stops (460). In one embodiment of interactive legend component 400, users can create a customized tag attribute. The custom tag attribute may be, for example, a set of preferred tags that have been updated within the last day. In another embodiment of interactive legend component 400, users can customize the interactive legend by repositioning, adding, or removing tag attributes from the displayed interactive legend.

Figure 5:
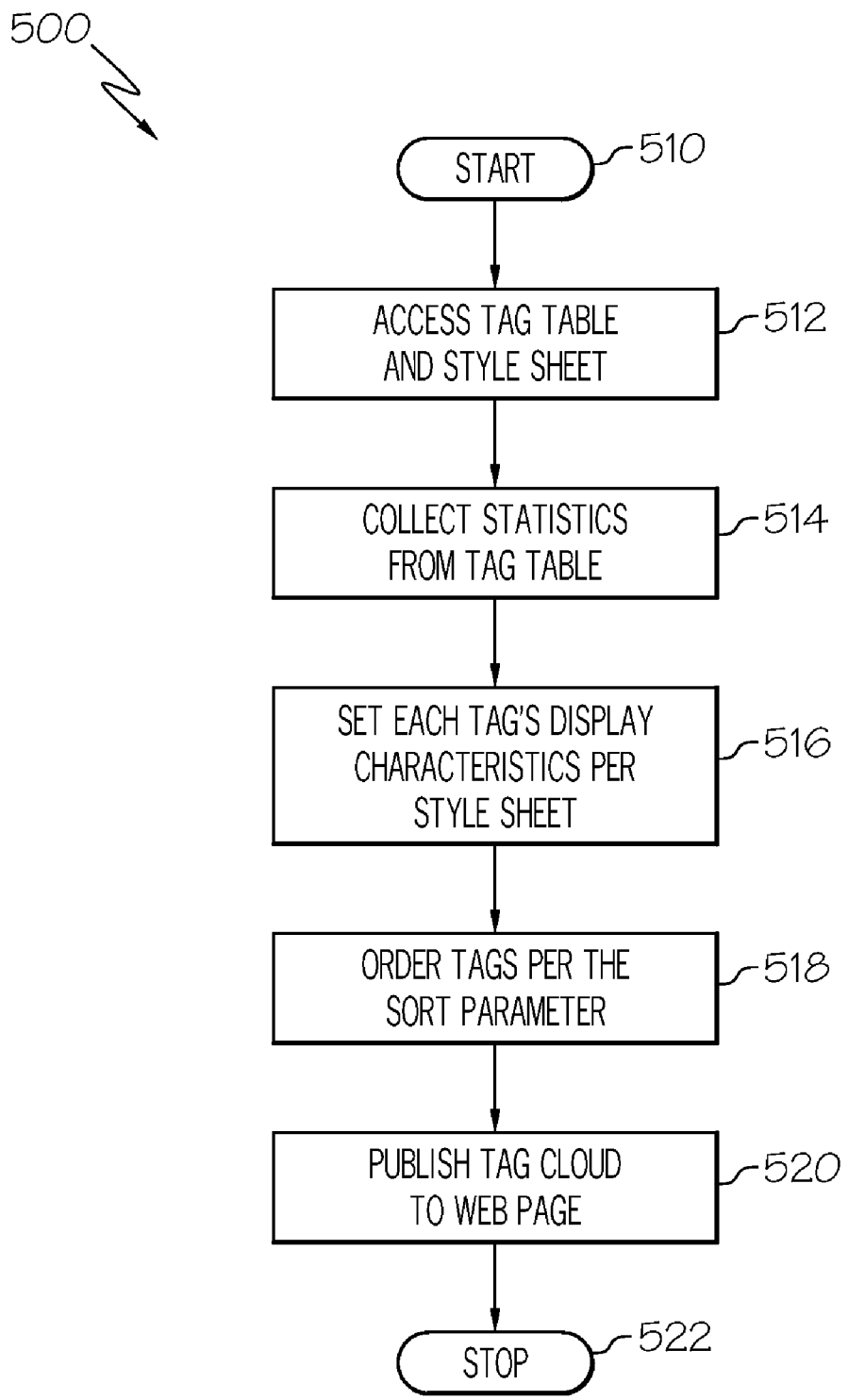
FIG. 5 is a flowchart of a tag cloud generator.

A shown by FIG. 5, tag cloud generator 500 starts whenever tag cloud web page 340 is first opened by web browser 330 or when initiated by interactive legend component 400 (510). Tag cloud generator 500 accesses tag table 360 and style sheet 370 (512). Tag cloud generator collects tag attribute statistics from tag table 360 (514), and sets each tag's display characteristic per the settings from style sheet 370 (516). Tag cloud generator 500 orders the tags per the sort parameter from style sheet 370 (518). Tag cloud generator 500 publishes the tag cloud in a frame of tag cloud web page 340 (520) and stops (522). The published tag cloud may include other detailed information related to each tag, that can viewed with hover effects, such as a mouse-over tool-tip, or an information line at the bottom of the web browser 330 window. The detailed information may include raw data associated with the tag, such as the actual number of times an item has been accessed, or the date and time an item was last updated.

Figure 6:
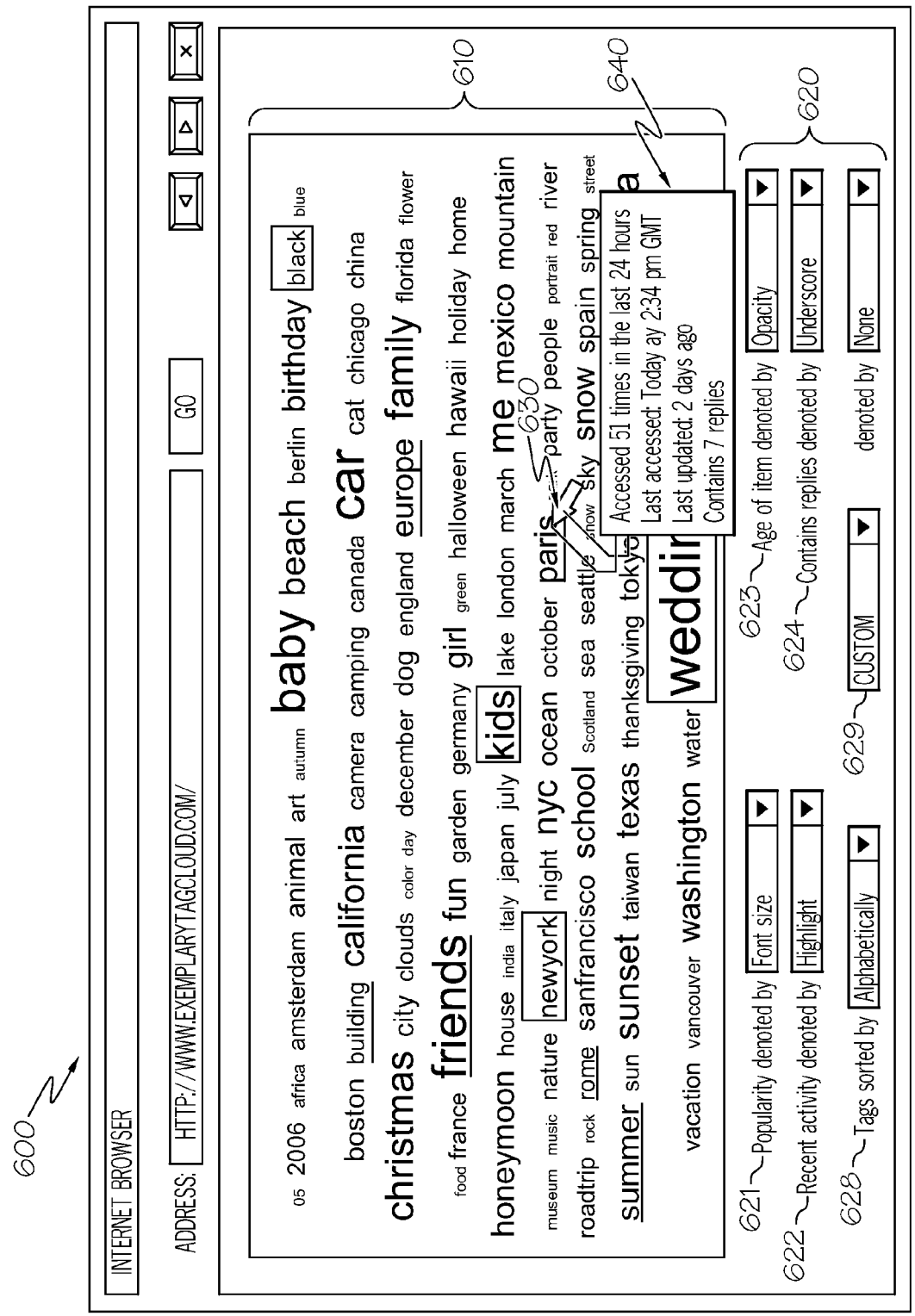
FIG. 6 is an exemplary web page with a customized tag cloud.

FIG. 6 shows Internet browser 600 with exemplary customized tag cloud 610 generated by TCC 300. Legend 620 lists tag attributes and corresponding display characteristics. Numeral 621 in legend 620 indicates that the "popularity" tag attribute is represented by the font size display characteristic. Thus, the "car" tag is more popular than the "cat" tag, which, in turn, is more popular than the "chicago" tag in tag cloud 610. Numeral 622 in legend 620 indicates that the "recent activity" tag attribute is represented by a highlighted font display characteristic. Thus the "newyork" tag has been accessed more recently than the "night" tag in tag cloud 610. Numeral 623 in legend 620 indicates that the "age" tag attribute is represented by the display characteristic of opacity. Thus, the more opaque "dog" tag is newer than the partially translucent "december" tag in tag cloud 610. Numeral 624 in legend 620 indicates that the "contains replies" tag attribute is represented by an underscore display characteristic. Thus, the "friends" tag has replies associated with the tag, but the "baby" tag in tag cloud 610 does not have replies associated with the tag. Numeral 628 in legend 620 indicates a "sort by" drop down menu, showing that tag cloud 610 is sorted alphabetically. Numeral 629 in legend 620 indicates a "custom" tag attribute drop down menu from which a user may create an attribute to display in tag cloud 610. The custom tag attribute is not selected, and the display characteristic is set to none, so the custom tag attribute is not represented in tag cloud 610. Mouse cursor 630 is hovering over the "paris" tag in tag cloud 610. Mouse-over tool-tip 640 shows tag attribute details related to the "paris" tag.

A preferred form of the invention has been shown in the drawings and described above, but variations in the preferred form will be apparent to those skilled in the art. Particularly, TCC 300 can be adapted to generate custom tag clouds, not just for web pages, but for any item with tags, such as computer files, database tables, electronic documents, audio and video files, digital images, blog entries, and internet bookmarks. The preceding description is for illustration purposes only, and the invention should not be construed as limited to the specific form shown and described. The scope of the invention should be limited only by the language of the following claims.

What is claimed is:

1. A computer implemented process for customizing a display of a tag cloud, the computer implemented process comprising:
    displaying an interactive legend in conjunction with the display of the tag cloud, the interactive legend comprising a plurality of tag attributes, each tag attribute associated with a drop down menu comprising a plurality of display characteristics;
    responsive to a selection of a display characteristic from the drop down menu, mapping the display characteristic to a tag in the tag cloud, each display characteristic representing one of the plurality of tag attributes;
    modifying the tag cloud, wherein each tag is displayed in accordance with a display characteristic mapped to the tag by the interactive legend; and
    wherein the tag attributes are rearranged, added, or removed from the interactive legend.

2. The computer implemented process of claim 1 wherein the plurality of display characteristics comprise: font color, font size, transparency, opacity, background color, borders, motion, underlines, italics, strikethroughs, three dimensional representation of depth, and shadowing.

3. The computer implemented process of claim 1 wherein the plurality of tag attributes comprise: popularity of an item, last update of an item, frequency of updates to an item, age of an item, size of an item, most recently accessed, and whether there have been comments or replies related to an item.

4. The computer process of claim 3 where the plurality of tag attributes further comprise: a custom tag attribute.

5. The computer implemented process of claim 1 further comprising: setting a sort criteria using one of the plurality of tag attributes and displaying the tag cloud with the plurality of tags ordered based upon the sort criteria.

6. The computer implemented process of claim 1 further comprising: displaying a plurality of details regarding a tag whenever a mouse cursor hovers over the tag in the tag cloud.

7. An apparatus for customizing a display of a tag cloud, the apparatus comprising:
    a processor;
    a memory connected to the processor;
    an indexing application running in the memory, operable to extract tags from a collection of items and collect usage statistics related to each item;
    a tag table file in the memory containing the indexed tags and statistics;
    a tag cloud customizer program in the memory operable to display an interactive legend, in conjunction with the display of the tag cloud, the interactive legend comprising a plurality of tag attributes, each tag attribute associated with a drop down menu comprising a plurality of display characteristics;
    responsive to a selection of a display characteristic from the drop down menu, mapping the display characteristic to a tag in the tag cloud, each display characteristic representing one of the plurality of tag attributes;
    modifying the tag cloud, wherein each tag is displayed in accordance with a display characteristic mapped to the tag by the interactive legend; and
    wherein the tag attributes are rearranged, added, or removed from the interactive legend.

8. The apparatus of claim 7 wherein the plurality of display characteristics comprise: font color, font size, transparency, opacity, background color, borders, motion, underlines, italics, strikethroughs, three dimensional representation of depth, shadowing and no display.

9. The apparatus of claim 7 wherein the plurality of tag attributes comprise: popularity of an item, last update of an item, frequency of updates to an item, age of an item, size of an item, most recently accessed, and whether there have been comments or replies related to an item.

10. The apparatus of claim 9 where the plurality of tag attributes further comprise: a custom tag attribute.

11. The apparatus of claim 7 wherein the tag cloud customizer program in the memory is further operable to set a sort criteria using one of the plurality of tag attributes and to display the tag cloud with the plurality of tags ordered based upon the sort criteria.

12. The apparatus of claim 7 wherein the tag cloud customizer program in the memory is further operable to save the mapped display characteristics to a style sheet file in the memory, and to generate the tag cloud based upon the tag table file and the style sheet file.

13. A computer readable memory containing a plurality of instructions configured to run on a processor of a computer to customize a display of a tag cloud, the plurality of instructions comprising:

a first instruction to display an interactive legend in conjunction with the display of the tag cloud, the interactive legend comprising a plurality of tag attributes, each tag attribute associated with a drop down menu comprising a plurality of display characteristics;

a second instruction, responsive to a selection of a display characteristic from the drop down menu, mapping the display characteristic to a tag in the tag cloud, each display characteristic representing one of the plurality of tag attributes;

a third instruction to modify the tag cloud, wherein each tag is displayed in accordance with a display characteristic mapped to the tag by the interactive legend; and wherein the tag attributes are rearranged, added, or removed from the interactive legend.

14. The computer readable memory of claim 13 wherein the plurality of display characteristics comprise: font color, font size, transparency, opacity, background color, borders, motion, underlines, italics, strikethroughs, three dimensional representation of depth, shadowing and no display.

15. The computer readable memory of claim 13 wherein the plurality of tag attributes comprise: popularity of an item, frequency of updates to an item, how recently an item was accessed, age of an item, size of an item, most recently accessed, and whether there have been comments or replies related to an item.

16. The computer readable memory of claim 15 where the plurality of tag attributes further comprise: a custom tag attribute.

17. The computer readable memory of claim 13 further comprising: an instruction to set a sort criteria using one of the plurality of tag attributes and an instruction to display the tag cloud with the plurality of tags ordered based upon the sort criteria.

* * * * *